May 22, 1956 M. G. SOGGE 2,746,472
SAFETY VALVE
Filed Dec. 13, 1952 2 Sheets-Sheet 1

INVENTOR
MELVIN G. SOGGE
BY
George H. Fisher
ATTORNEY

May 22, 1956  M. G. SOGGE  2,746,472
SAFETY VALVE

Filed Dec. 13, 1952  2 Sheets-Sheet 2

INVENTOR
MELVIN G. SOGGE
BY
George H. Fisher
ATTORNEY

United States Patent Office 2,746,472
Patented May 22, 1956

2,746,472
SAFETY VALVE

Melvin G. Sogge, Los Angeles, Calif., assignor to Minneapolis-Honeywell Regulator Company, Minneapolis, Minn., a corporation of Delaware Application December 13, 1952, Serial No. 325,855

11 Claims. (Cl. 137—66)

This invention relates to safety valves for use with gas burners and, more specifically, it relates to a combination of a thermocouple controlled safety valve, a rotary plug valve, and actuating means of the "interlock" type for actuating the plug valve and resetting the safety valve.

Combined valves of the above mentioned type are generally well known in the heating controls art so this invention is concerned with the general improvement of such a combination to reduce the cost thereof and to provide additional operating features.

One of the objects of the invention is to provide a combination valve of the above mentioned type which is of superior construction but less costly than prior art devices of this same general combination.

Another object of the invention is to provide a combined thermocouple safety and plug valve of the "interlock" type wherein stops are provided for stopping movement of the resetting and plug valve actuating means at the "off," "pilot" and "on" positions.

A further object of the invention is to provide in a combined safety valve and plug valve, a single means for resetting the safety valve and rotating the plug valve, which resetting means has "interlock" means for preventing the resetting of the safety valve when the plug valve is in its "on" position.

Another object of the invention is to provide a combination as set forth in the preceding paragraph wherein the stops are so designed that the plug valve may be freely rotated from the "off" position past the "on" position to the "pilot" position and then back to the "on" position, but requiring axially movement prior to rotary movement from the "on" position to the "off" position.

Still another object of the invention is to provide a combined safety valve and manually operable valve that provides "100 per cent safety shut-off" of the pilot gas and main gas controlling means and wherein the resetting and valve actuating mechanism is freely rotatable from its "off" position to the "pilot" position and from the "pilot" position to the "on" position but prevents accidental movement of the manual valve to the "off" position in moving said valve from the "pilot" position to the "on" position.

Other objects of the invention will become apparent on reading the following detailed description of the invention in conjunction with the accompanying drawing wherein.

Figure 3:
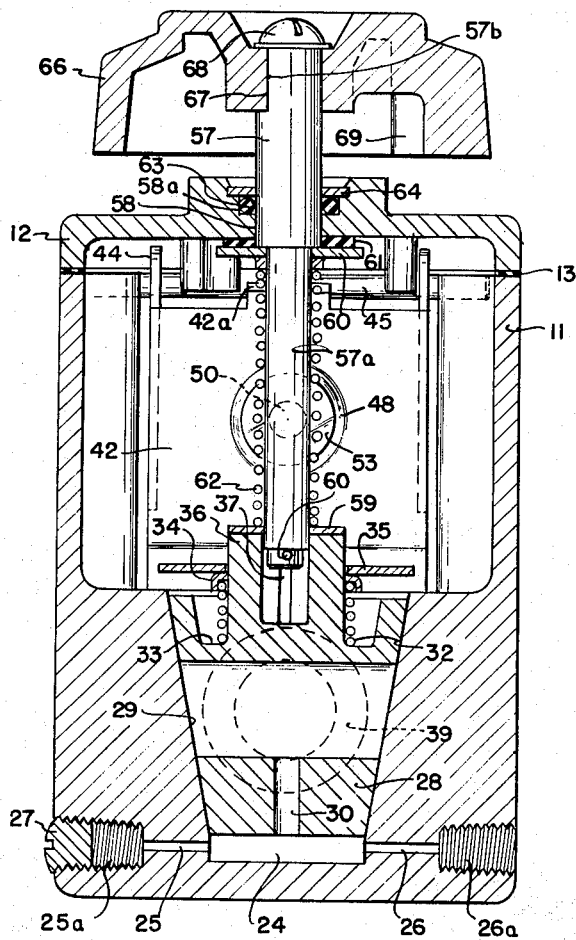
Figure 3 is a cross-sectional view taken along the line 3—3 of Figure 2.

A body or housing of the control device consists of a lower casting 11 and an upper casting 12 fastened together with a gasket 13 therebetween, by means of screws 14 extending through holes in the top casting 12 and screw threaded into threaded bores 15 in the lower casting 11. The lower casting 11 is provided with threaded inlet and outlet openings 16 and 17, respectively, and a countersunk opening 18 above the inlet opening through which a connector stem 19 of an electromagnetic unit 20 extends. The electromagnetic unit 20 is held in its assembled position in said casting 11 by means of a bevelled nut 21 threaded upon the connector stem 19. A thick partition wall 22, between the inlet 16 and outlet 17 has a bore 23a—23b extending therethrough, in coaxial alignment with the inlet and outlet openings, and a tapered bore 24 extending downwardly from the top of said partition wall 22 and in intersecting relationship with the bore 23a—23b. Extending inwardly from opposite sides of the casting 11, as can best be seen in Figure 3, are small bores 25 and 26 terminating at their inner ends at the bottom of bore 24 and terminating at their outer ends in threaded enlarged bores 25a and 26a, respectively, which may be selectively sealed by a plug 27 or connected by a suitable conduit (not shown) to a pilot burner, schematically shown in Figure 1 and designated by the letter B.

Positioned within the tapered bore 24, is a rotary plug valve 28 having a diametrically extending bore 29 adapted to register with the bore 23a and 23b in its "on" position, a small coaxial bore extending from the lower end thereof to said bore 29 for conducting gas from the bore 29 to the bottom of the bore 24 to supply gas to the pilot burner, and an arcuate groove 31 extending from one end of the bore 29 around the surface of the valve 28 to the other end of the bore 29, to conduct gas from the bore 23a to the pilot burner when the valve 28 is in the "pilot" position. The plug valve 28 is resiliently biased into seating engagement in the bore 24 by means of a spring 32 bearing against the bottom of an annular groove 33 formed in the upper end of the plug valve. The upper end of the spring 32 reacts against a spring retainer 34 which in turns reacts against a plate 35 secured at opposite ends thereof to the casting 11 by means of bolts 36. The valve 28 has an axially extending tubular portion 28a that extends upwardly through the spring 32, retainer 34 and plate 35 and is longitudinally grooved at 37 for a purpose to be presently described.

The surface of the partition wall 22 at the inlet end of the bore 23a is machined to provide a valve seat 38 for a safety valve 39. The valve 39 has a rubber or other suitable material seat-engaging portion 40 and a reduced diameter portion 41 extending through a hole in the lower end of an actuating lever 42 for said valve. The valve 49 is retained on said lever by means of a clip spring 43 fitting in an annular groove in the reduced diameter portion 41. The upper end of the lever 42 is provided with parallel extending wing portions 44, which are apertured to receive a pivot 45 that extends across the top of the body casting 11 and rests in vertically extending grooves 46 and 47 extending downwardly from the top edge of the casting 11. A dished central portion 48 of the lever 42 has an aperture 49 therethrough and through which an armature stem 50 of the electromagnetic unit 20 extends. The stem 50 carries an armature 51 at one end thereof for engaging core ends 52 of the electromagnetic unit 20. The other end of the stem carries a head or abutment member 53 for engaging one side of the lever 42 and has fixedly secured thereto, on the opposite side of the lever 42 from the head 53, a spring abutment plate 54 held in place by two spring rings 55 positioned in annular grooves in the stem 50. The armature 51 and the lever 42 are normally biased toward the right as viewed in Figure 1 to hold the valve 39 in seating engagement with the valve seat 38 by means of a coil compression spring 56 positioned between the right hand end of the housing for the electromagnet and the spring abutment plate 54.

Figure 5:
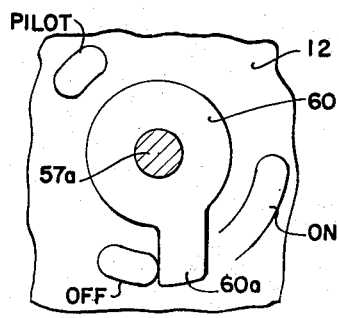
Figure 5 is a cross-sectional view taken along the line 5—5 of Figure 1.
Figure 4:
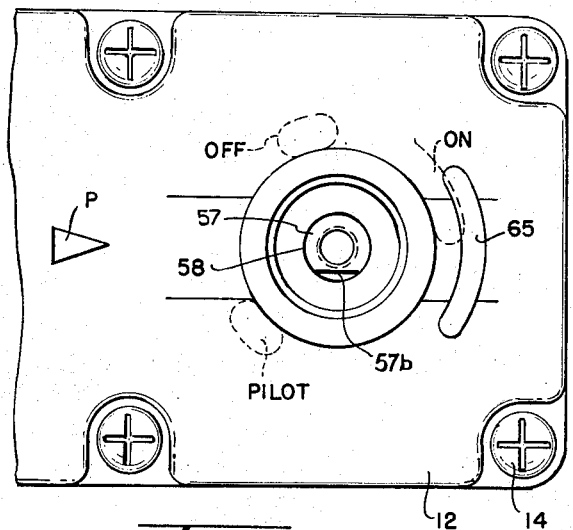
Figure 4 is a fragmentary view of the top of the control device with the dial removed.

It will be observed that when the electromagnet 29 is energized by the presence of a flame at the pilot burner B, armature 51 will be held to the core ends 52 against the bias of spring 56 and, thereby, will hold the valve 39 in its open position. While the electromagnet is sufficiently strong to hold the armature 51 against the bias of said spring, it is not sufficiently strong to pull the armature into engagement with the core ends 52. This necessitates a manual resetting of the armature against the electromagnet core ends and the valve 39 in its open position by means of a reset stem 57, which extends from the exterior of the control housing through an aperture 58 in the top casting 12 to the inside of the casting 11. The stem has a reduced diameter portion 57a which extends downwardly through a spring bearing washer 59 and into the sleeve portion 36 of the plug valve 28. A pin 57C extends through the stem 57a and beyond each side thereof into the grooves 37 in said sleeve, to provide rotational and longitudinal sliding engagement with the plug valve 28. Positioned against the shoulder provided between the upper portion 57 and the reduced diameter portion 57a, is an annular abutment member 60 having a transversely extending arm 60a (see Figure 5). This abutment member is fixedly secured to the stem 57 by any suitable means, such as by spot welding, and is resiliently urged against the insidea surface of the casting 12, with a sealing washer 61 therebetween, by means of a coil spring 62 extending between said abutment 60 and the washer 59. It will thus be seen that besides sealing the stem 57 with respect to the housing 12, the spring 62 additionally loads the valve 28 in the bore 24. The stem 57 is additionally sealed against gas leakage by means of a rubber O ring 63 held in place in an enlarged diameter portion 58a of the bore 58 and by a washer 64 placed over said O ring. The abutment member 60 is adapted to engage an arm 42a extending substantially radially away from the pivot 45, after it has been moved axially of the valve 28 a predetermined distance. Continued movement of the stem 57 will cause the lever 42 to rock clockwise about the pivot 45 to open the valve 49 and to position the armature 51 against the core ends 52.

Means are provided on said reset stem 57 in the top casting 12 to prevent the resetting of the safety valve wherein the plug valve is in its "on" position, that is with the bore 29 in alignment with the bore 23a. This means consists of an arcuate pad 65 formed on the upper surface of the casting 12. Non-rotatably mounted on the upper end of the stem 57 is a dial 66 having a non-round bore 67 therein snugly fitting the upper end of the stem 57 having a flattened portion 57b and held in place on said end portion by means of a screw 68. This dial has a thickened wall portion 69 forming an arcuate pad at the lower edge thereof for engagement with the upper surface of the arcuate pad 65 except when the plug valve 28 is in a position where no gas can flow from the passage 23a directly into either end of the bore 29. The lower edge of the dial 66 is spaced from the upper surface of the pad 65 a short distance for a purpose to now be described.

Figure 6:
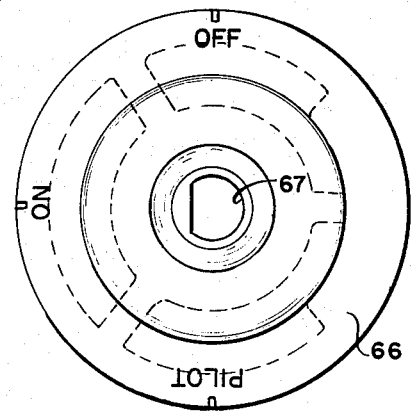
Figure 6 is a plan view of the manually operable dial of the control device.

Located on the inner surface of the casting 12 at spaced points around the bore 58, are stops designated by the words "off," "pilot," and "on." These stops are adapted to be engaged by the arm 60a and to limit the annular movement of the plug valve 28 at its "off," "pilot," and "on" positions. The length of the "off," and "pilot" stops axially of the stem 57 is such that no matter how far the dial 66 is moved inwardly, the arm 60a cannot rotate past said stops. The length of the "on" stop axially of the stem 57 is no greater than the distance between the pad 65 and the pad 69 so that the dial 66 may be moved inwardly when the plug valve is in its "on" position a sufficient distance so that the arm can swing over the "on" stop to the "off" position. The "on" stop is also bevelled from the side nearest the "pilot" stop to the inner surface of the casting 12 in the direction of the "off" stop. It will thus be seen that rotary movement of the shaft 57 and the arm 60a away from the "off" stop will cause the arm 60a to be cammed up over the "on" stop against the bias of spring 62, without the operator having to exert an axial thrust on the dial 66, to move the plug valve from its "off" position to its "pilot" position. Indicia on the upper edge of the dial, shown in Figure 6, cooperates with a pointer "P" on the outer surface of the casting 12 to indicate whether the plug valve is in its "off," "pilot," or "on" position.

*Operation*

Figures 1, 2:
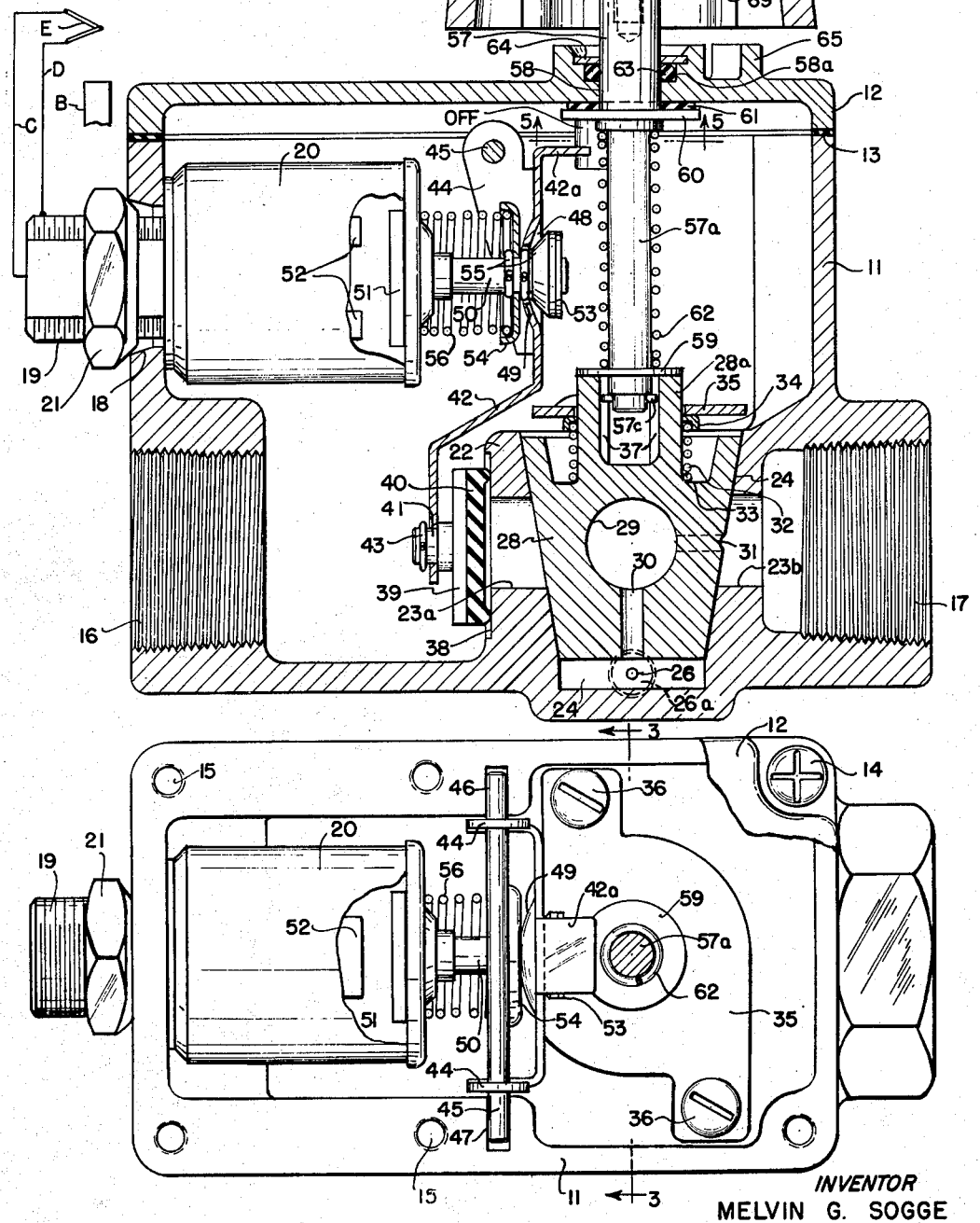
Figure 1 is a cross-sectional view along the longitudinal axis of the control device, showing it schematically connected to a thermocouple which is positioned to be heated by a pilot burner.
Figure 2 is a plan view of the control device with the top casting or cover removed.

With the control device described above installed in a heating system in a conventional manner, with the electromagnet connected as shown schematically in Figure 1 to a thermocouple E by means of leads CD the heating system may be placed in operation by rotating the dial 66 from its "off" position, as shown in Figure 1 clockwise 180 degrees to its "pilot" position with the arm 60a against the "pilot" stop. This places the arcuate groove 31 in register with the bore 23a and the arcuate pad 69 out of alignment with the arcuate pad 65. Inward movement of the dial 66 will then cause the abutment 60 to engage the arm 42a of the lever 42 and move the safety valve 39 to its open position and the armature 51 into engagement with the electromagnet core ends 52. Gas will then flow from the inlet 16 through the bore 23a, through the arcuate grooves 31, through bore 30 and bore 26 to the pilot burner. Ignition of the pilot burner may then take place. After sufficient time has been allowed for the thermocouple to be heated sufficiently to cause the electromagnet to hold the armature 51, the dial may be permitted to return axially of the plug valve and the dial then rotated counterclockwise until the arm 60a engages the "on" stop. This will bring the bore 29 into register with the bore 23b to permit gas to flow from the inlet 16 past valve 39 and through plug valve 28 to the main burner. Gas will also continue to flow to the pilot burner from the bore 29 through the passage 30. To move the plug valve from the "pilot" position or the "on" position to cut off both the pilot and main gas and thus require reigniting the pilot burner, the dial must be moved axially and then rotated to move arm 60a over the "on" stop.

Upon pilot burner flame failure, the thermoelectric unit will become deenergized permitting the spring 56 to bias the safety valve 39 closed. This will cut off the flow of gas to both the main and pilot burners. The system may be placed in operation again merely by rotating the plug valve from the "on" position to the "pilot" position without having first moved the plug valve to its "off" position. Inward movement of the dial will reset the safety valve in the same manner as described above.

In order to shut down the heating system, it is necessary to first depress the dial to bring the arcuate pad 69 into engagement with the arcuate pad 65, at which position the arm 60a will be in a plane below the lower edge of the "on" stop, before the dial can be rotated from the "on" position to the "off" position. While the arcuate pads 65 and 69 are of such relationship that the dial 66 may be moved inwardly without said pads engaging, so as to cause the safety valve to be moved to its "open" position, no gas will flow to either the pilot burner or the main burner in view of the fact that neither the bore 29 nor the arcuate groove 31 is in communication with the bore 23a. Therefore, axial movement of the dial 66 in either its "off" or "on" positions, to the full extent that they can be moved in said positions, will not cause gas to flow to either the main or pilot burners.

While the preferred embodiment of the invention has been described above in considerable detail, it is readily apparent that modifications may be made therein without departing from the spirit of the invention. Therefore, it is to be expressly understood that the scope of the invention is determined solely from the appended claims.

I claim as my invention:

1. A control device comprising a valve body having axially aligned inlet and outlet openings, a partition between said openings, a first bore through said partition substantially coaxial with said openings, a second bore closed at one end and intersecting said first bore, a small outlet opening extending from said second bore through a wall of said body near the closed end of said second bore, a rotary valve positioned in said second bore, said rotary valve having a diametrically extending third bore therethrough alignable with said first bore and an arcuate groove in the outer surface of said rotary valve extending from one end of said third bore to the other end thereof and an axial fourth bore in said rotary valve extending from said third bore to the space between one end of said rotary valve and the closed end of said second bore, the other end of said rotary valve having a splined socket therein, a valve stem having a splined end extending into said splined socket and the other end thereof extending through an opening in said valve body to the exterior thereof, a manually operable dial secured to said other end of said stem and spaced from said valve body, an annular abutment member secured to said stem adjacent the inner surface of said valve body and having a radially extending arm thereon, resilient means biasing said abutment member against said inner body surface, spaced stops on said inner surface and cooperable with said radially extending arm to limit the rotating movement of said dial and valve, one of said stops being located to engage said radially extending arm when said third bore is coaxial with said first bore and being less high than the other stops and having a bevelled side which permits said arm to slide over said stop upon rotation in one direction but requiring axial movement of said dial before said arm can be rotated past said stop in the opposite direction, said other stops being located so as to engage said arm when said third bore and arcuate groove is out of register with the inlet end of said first bore and when the arcuate groove only is in register with said inlet end of said first bore, respectively.

2. A control device comprising a valve body having an inlet and a plurality of outlet openings, a partition between said openings, a first bore through said partition, one end of said bore being located for connection to a main burner through one of said outlet openings, a second bore closed at one end and intersecting said first bore, a small outlet opening extending from said second bore through a wall of said body for connection with a pilot burner through a second of said outlet openings, a rotary valve positioned in said second bore and rotatable between an "on" position wherein gas may flow from said inlet to both of said outlet openings and a pilot position wherein gas may flow and from said inlet to the second of said outlet openings only and an "off" position wherein gas may flow from said inlet to neither of said outlet openings, said rotary valve having a diametrically extending third bore therethrough alignable with said first bore and an arcuate groove in the outer surface of said rotary valve extending from one end of said third bore to the other end thereof and an axial fourth bore in said rotary valve extending from said third bore to the space between one end of said rotary valve and the closed end of said second bore, a valve stem having at one end a non-rotatable and axially slidable connection with said rotary valve and the other end thereof extending through an opening in said valve body to the exterior thereof, a manually operable dial secured to said other end of said stem and spaced from said valve body, an abutment member secured to said stem adjacent the inner surface of said valve body and having a radially extending arm thereon, resilient means biasing said abutment member toward said inner body surface, and spaced stops on said inner surface and cooperable with said radially extending arm to limit the rotating movement of said dial and valve, one of said stops being engageable by said arm at the valve "off" position and another engageable by said arm at the valve "pilot" position and another being less high than the other stops and engageable by said arm at the valve "on" position of said dial and valve.

3. A control device comprising a valve body having inlet and outlet openings, a partition between said openings, a first bore through said partition, a second bore intersecting said first bore, a rotary valve positioned in said second bore, said rotary valve having a third bore extending therethrough and alignable with said first bore in valve open position, one end of said rotary valve having a splined socket therein, a valve stem having a splined end extending into said splined socket and the other end thereof extending through an opening in said valve body to the exterior thereof, a manually operable dial secured to said other end of said stem and spaced from said valve body, an annular abutment member secured to said stem adjacent the inner surface of said valve body and having a radially extending arm therein, resilient means biasing said abutment member toward said inner body surface, a stop on said inner surface cooperable with said radially extending arm to stop the rotating movement of said dial and valve at valve open position, said stop having a bevelled side which permits said arm to slide over said stop upon rotation in one direction but requiring axial movement of said dial before said arm can be rotated past said stop in the opposite direction.

4. A control device comprising a valve body having inlet and outlet openings, a partition between said openings, a first bore through said partition, a second bore closed at one end and intersecting said first bore, an opening extending from said second bore through a wall of said body, a rotary valve positioned in said second bore, said rotary valve having a diametrically extending third bore therethrough alignable with said first bore and a groove in the outer surface of said rotary valve extending from one end of said third bore to the other end thereof and a fourth bore in said rotary valve extending from said third bore to the space between one end of said rotary valve and the closed end of said second bore, the other end of said rotary valve having a splined socket therein, a valve stem having a splined end extending into said splined socket and the other end thereof extending through an opening in said valve body to the exterior thereof, a manually operable dial secured to said other end of said stem and spaced from said valve body, an abutment member secured to and extending around said stem adjacent the inner surface of said valve body, resilient means biasing said abutment member toward said inner body surface, an arcuate pad on the outer surface of the valve body under said dial, and a pad on said dial cooperable with said arcuate pad to prevent substantial axial movement of said dial when in its position wherein said third bore of said rotary valve is registering with said first bore, a safety valve controlling fluid flow to said rotary valve, and safety valve actuating means cooperable with said annular abutment member, for resetting said safety valve upon substantial axial movement of said dial.

5. A safety valve comprising a valve body having an inlet and a first outlet for connection with a main burner and a second outlet for connection with a pilot burner, a rotary valve for controlling the flow of fuel from said inlet to said outlets, said rotary valve having passages therein so arranged that it is movable to an "off" position where no gas flows to the first or second outlet and to a "pilot" position where gas flows only to the second outlet and to an "on" position where gas flows to both outlets, a safety valve controlling the flow of fuel to said rotary valve, a lever for actuating said safety valve, condition responsive means for holding said safety valve open but incapable of opening it, reset means for turning said rotary valve and axially slidable relative to said rotary valve for engaging said lever and moving the safety valve to open position, means to prevent axially slidable movement of said reset means when said rotary valve is in its "on" position, and stop means cooperating with said reset means to permit unobstructed rotary movement thereof from "off" to "pilot" positions and between "pilot" and "on" positions but requiring axial movement and then rotary movement of said reset means to move from "on" position to "off" position.

6. A safety valve comprising a valve body having an inlet and a first outlet for connection with a main burner and a second outlet for connection with a pilot burner, a rotary valve for controlling the flow of fuel from said inlet to said outlets, said rotary valve having passages therein so arranged that it is movable to an "off" position where no gas flows to the first or second outlet and to a "pilot" position where gas flows only to the second outlet and to an "on" position where gas flows to both outlets, a safety valve controlling the flow of fuel to said rotary valve, motion transmitting means for actuating said safety valve, thermocouple energizable electromagnetic means for holding said safety valve open but incapable of opening it, reset means for turning said rotary valve and axially slidable relative to said rotary valve for engaging said motion transmitting means and moving the safety valve to open position, means to prevent opening movement of said safety valve when said rotary valve is in its "on" position, and stop means cooperating with said reset means to permit unobstructed rotary movement thereof from "off" to "on" and "pilot" positions and between "pilot" and "on" positions but requiring axial movement and then rotary movement of said reset means to move from "on" position to "off" position.

7. A safety valve comprising a valve body having an inlet and a first outlet for connection with a main burner and a second outlet for connection with a pilot burner, a rotary valve for controlling the flow of fuel from said inlet to said outlets, said rotary valve having passages therein so arranged that it is movable to an "off" position where no gas flows to the first or second outlet and to a "pilot" position where gas flows only to the second outlet and to an "on" position where gas flows to both outlets, a pivoted lever carrying at one of its ends a safety valve for controlling the flow of fuel to said rotary valve, condition responsive means engaging said lever for holding said safety valve open but incapable of opening it, reset means for turning said rotary valve and axially slidable relative to said rotary valve for engaging said lever for moving the safety valve to open position, and means to prevent opening movement of said safety valve by said reset means when said rotary valve is in its "on" position.

8. A safety valve comprising a valve body having an inlet and a first outlet for connection with a main burner and a second outlet for connection with a pilot burner, a rotary valve for controlling the flow of fuel from said inlet to said outlets, said rotary valve having passages therein so arranged that it is movable to a first position where no gas flows to the first or second outlet and to a second position where gas flows only to the second outlet and to a third position where gas flows to both outlets, a safety valve for controlling the flow of fuel to said rotary valve, a pivoted lever for actuating said safety valve, condition responsive means for holding said safety valve open but incapable of opening it, reset means for turning said rotary valve and axially slidable relative to said rotary valve, an abutment on said reset means engageable with said pivoted lever in substantially all angular positions of said rotary valve for moving the safety valve to open position upon axial movement of said reset means, and means to prevent axial movement of said reset means when said rotary valve is in its third position.

9. In a safety device, the combination comprising a housing having an inlet and two outlets; a rotary valve movable between "off," "pilot" and "on" positions; a first passage in said housing extending between said inlet and said valve; a second passage in said housing extending from said valve to a first of said outlets; a third passage in said housing extending from said valve to a second of said outlets; said rotary valve having passages therein for conducting fluid from said inlet to neither of said outlets in the "off" position thereof but to conduct fluid from said inlet to both of said outlets in the "on" position thereof and to the second outlet only in the "pilot" position thereof; a safety valve having "open" and "closed" positions and positioned to control fluid flow to said rotary valve; means for biasing said safety valve closed; condition responsive means for holding said safety valve open; reset means axially slidable but non-rotatably connected to said rotary valve and having an abutment thereon for engaging and moving said safety valve to its open position; means on said housing and said reset means for preventing sufficient axial movement of said reset means to open said valve when said rotary valve is in its "on" position; an arm rotatable with said reset means; and first, second and third stops on said housing and cooperable with said arm for stopping rotary movement of said reset means and rotary valve at said "off," "pilot" and "on" positions, respectively, said third stop being of less axial depth and having a bevelled side so that said arm will cam axially and rotatably over said stop upon rotary movement of said valve from its "off" position to its "pilot" position.

10. In a safety device, the combination comprising a housing having an inlet and two outlets; a rotary valve movable between "off," "pilot" and "on" positions; a first passage in said housing extending between said inlet and said valve; a second passage in said housing extending from said valve to a first of said outlets; a third passage in said housing extending from said valve to a second of said outlets; said rotary valve having passages therein for conducting fluid from said inlet to neither of said outlets in the "off" position thereof but to conduct fluid from said inlet to both of said outlets in the "on" position thereof and to the second outlet only in the "pilot" position thereof; a safety valve having "open" and "closed" positions; means for biasing said safety valve closed; condition responsive means for holding said safety valve open; reset means axially slidable but non-rotatably connected to said rotary valve and having an abutment thereon for engaging and moving said safety valve to its "open" position; abutments on said housing and said reset means for preventing sufficient axial movement of said reset means to open said valve when said rotary valve is in its "on" position; an arm rotatable with said reset means; and means cooperable with said arm for stopping rotary movement of said reset means from said "pilot" position at said "on" position, said means being of such axial depth that said arm can pass over said means upon slight axial and then rotary movement of said reset means to move said valve from its "on" position to its "off" position.

11. In a safety device, the combination comprising a housing having an inlet and two outlets; a rotary valve movable between "off," "pilot" and "on" positions; a first passage in said housing extending between said inlet and said valve; a second passage in said housing extending from said valve to a first of said outlets; a third passage in said housing extending from said valve to a second of said outlets; said rotary valve having passages therein for conducting fluid from said inlet to neither of said outlets in the "off" position thereof but to conduct fluid from said inlet to both of said outlets in the "on" position thereof and to the second outlet only in the "pilot"

position thereof; a safety valve having "open" and "closed" positions; means for biasing said safety valve closed; condition responsive means for holding said safety valve open; reset means axially slidable but non-rotatably connected to said rotary valve and having an abutment thereon for engaging and moving said safety valve to its "open" position; means on said housing and said reset means for preventing sufficient axial movement of said reset means to open said valve when said rotary valve is in its "on" position; an arm rotatable when said reset means; and first, second and third stops on said housing and cooperable with said arm for stopping rotary movement of said reset means and rotary valve at said "off," "pilot" and "on" positions, respectively, one of said stops being shorter than the other two stops so that slight axial movement of said reset means will enable the reset means to be rotated past said stop to the other positions.

References Cited in the file of this patent
UNITED STATES PATENTS

| | | |
|---|---|---|
| 2,513,705 | Arden | July 4, 1950 |
| 2,588,179 | Thornbery | Mar. 4, 1952 |
| 2,596,796 | Solovieff | May 13, 1952 |
| 2,607,529 | Garner | Aug. 19, 1952 |
| 2,624,338 | Ray | Jan. 6, 1953 |
| 2,627,911 | McCarty et al. | Feb. 10, 1953 |
| 2,636,505 | Paille | Apr. 28, 1953 |
| 2,650,028 | Grayson | Aug. 25, 1953 |